United States Patent [19]
Bonacorsi

[11] Patent Number: 5,857,556
[45] Date of Patent: *Jan. 12, 1999

[54] OVERHEAD CONVEYER CURVE GUIDE

[75] Inventor: Richard Bonacorsi, Smiths Creek, Mich.

[73] Assignee: Chrysler Corporation, Auburn Hills, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 766,213

[22] Filed: Dec. 12, 1996

[51] Int. Cl.⁶ .................................................. B65G 15/60

[52] U.S. Cl. ........................... 198/683; 198/686; 198/841

[58] Field of Search ................................. 198/860.1, 837, 198/841, 683, 678.1, 681, 684, 685, 686, 687

[56] References Cited

U.S. PATENT DOCUMENTS

| | | | |
|---|---|---|---|
| 1,874,042 | 8/1932 | Hoefen | 198/683 |
| 1,876,659 | 9/1932 | Francis | 198/683 |
| 2,371,624 | 3/1945 | Hudson | 198/687 |
| 2,915,169 | 12/1959 | Abbey | 198/683 |
| 3,450,250 | 6/1969 | Frisk | 198/778 |
| 3,964,800 | 6/1976 | Grimes et al. | 198/841 |
| 4,029,199 | 6/1977 | Reens | 198/683 |
| 4,471,867 | 9/1984 | Forshee | 198/687 |
| 4,576,277 | 3/1986 | Park et al. | 198/803.01 |

Primary Examiner—James R. Bidwell
Assistant Examiner—Patrick Mackey
Attorney, Agent, or Firm—Lawrence J. Shurupoff

[57] ABSTRACT

A horizontal conveyor chain is guided along a curved section in the path of the conveyor by an elongated guide strip. The guide strip is mounted in a fixed horizontal position closely adjacent to and on the radially inner side of the curved section of the path in sliding contact with the chain. The guide strip is made of a hard, slippery plastic material, preferably nylon or Teflon.

1 Claim, 3 Drawing Sheets

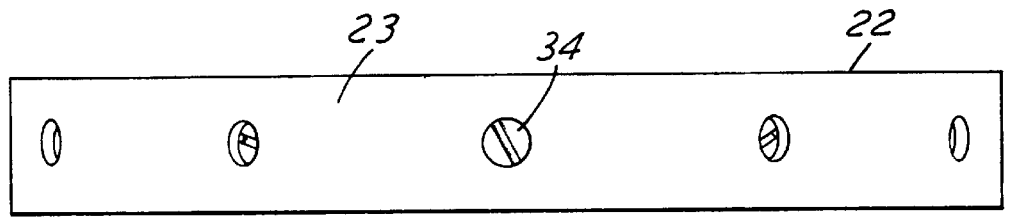
FIG.5
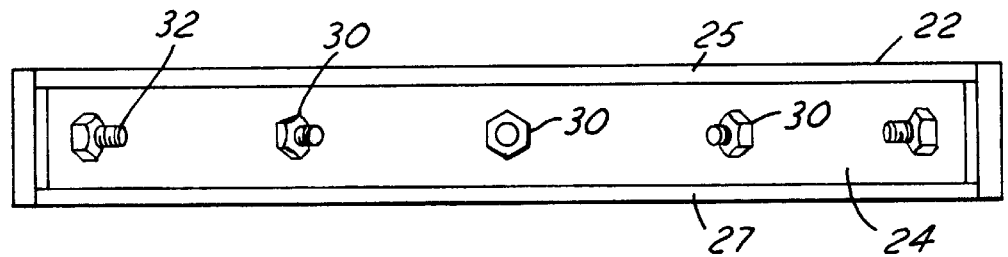
FIG.6
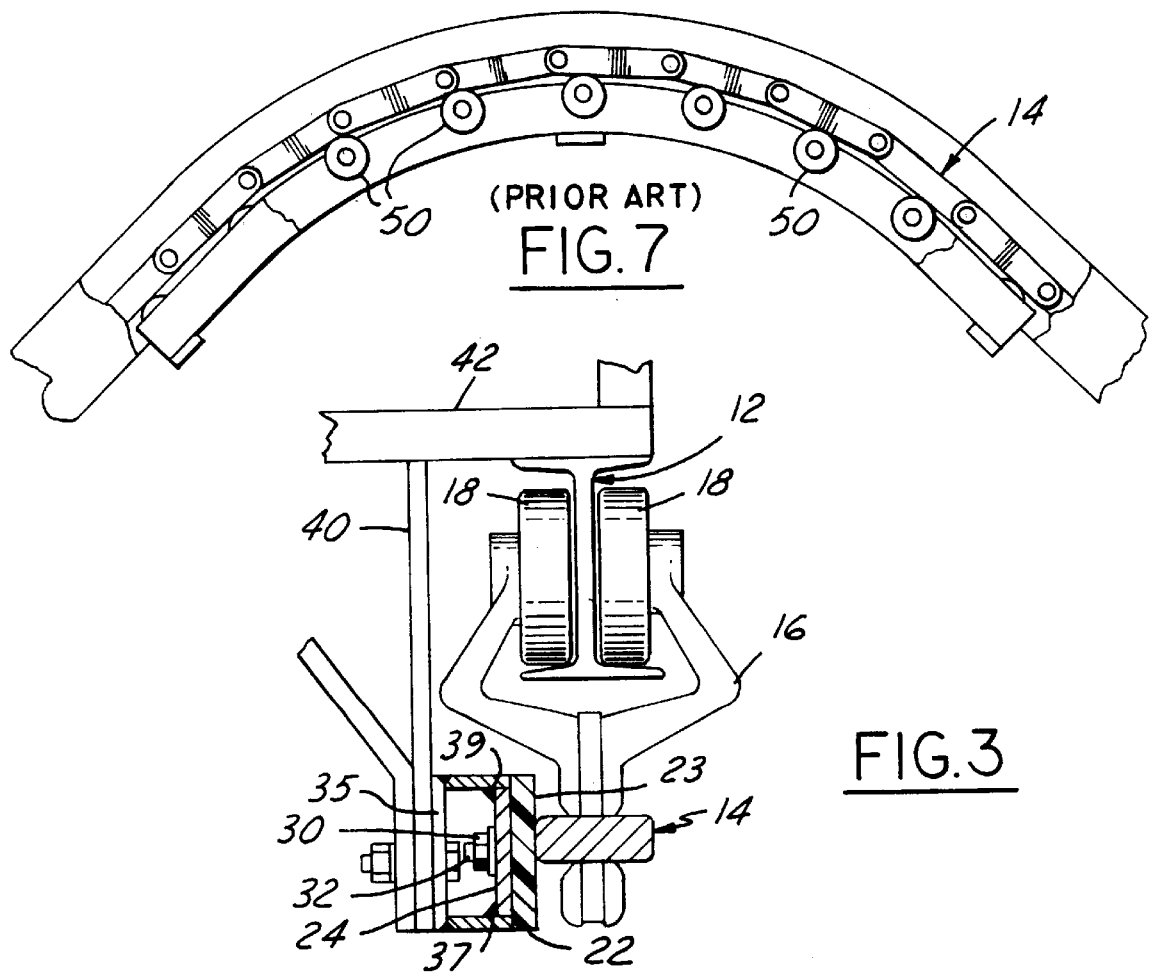
(PRIOR ART)
FIG.7
FIG.3

OVERHEAD CONVEYER CURVE GUIDE

FIELD OF THE INVENTION

This invention relates generally to conveyor systems and more particularly to a guide for assisting a conveyor chain around a curved section in the conveyor path.

BACKGROUND AND SUMMARY

In a typical conveyor system, a conveyor chain is suspended from an I-beam by hangers. When the chain goes around a curve in the conveyor path, a guide is needed to help the chain around the curve and prevent the hangers from binding. Presently, the guide consists of a series of steel segment rollers which turn on vertical axes and are arranged in a line which follows the curve. The rollers are very expensive and have a relatively short life. Accordingly, the rollers have to be replaced frequently at considerable cost.

In accordance with the present invention, the guide rollers are eliminated and instead a single plastic guide strip is substituted, which may be made of any suitable plastic material, preferably nylon or Teflon. The guide strip provides a continuous guiding surface extending in an arc corresponding to the radius of the curve in the path of the conveyor. The chain slides over the smooth outer surface of the guide strip. Plastic guide strips are considerably cheaper and much longer lasting than rollers. The plastic surface of these strips is quite slippery and minimizes the increase in power required to guide the chain around a turn.

One object of this invention is to provide a guide for the conveyor chain in a conveyor system having the foregoing features and capabilities.

Another object is to provide a guide for the conveyor chain which is in the form of a single, simple strip of plastic and replaces the several rollers heretofore required, is rugged and durable in use, and is capable of being inexpensively manufactured and installed.

These and other objects, features and advantages of the invention will become more apparent as the following description proceeds, especially when considered with the accompanying drawings.

BRIEF DESCRIPTION OF THE DRAWINGS

FIG. 3 is a sectional view taken on the line 3—3 in FIG. 2.

FIG. 5 is a detail view of the guide strip as seen from the radially outer side thereof.

FIG. 6 is a detail view of the guide strip as seen from the radially inner side, and also showing a metal mounting strip on the inner surface of the guide strip.

FIG. 7 is a plan view of a prior art chain guide consisting of a plurality of rollers extending in a line just inside the path of the chain.

DETAILED DESCRIPTION OF THE PREFERRED EMBODIMENT

Figure 1:
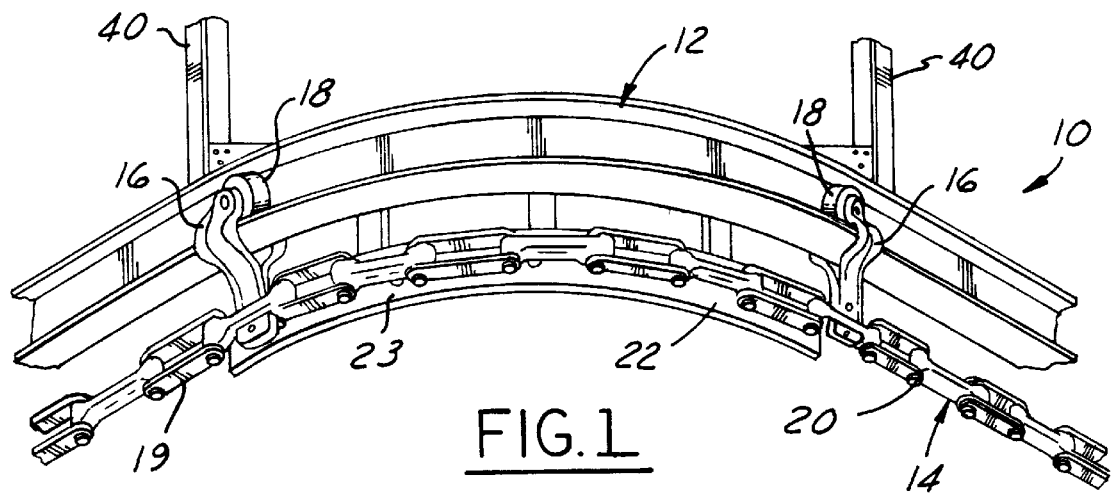
FIG. 1 is a fragmentary perspective view showing a guide strip of this invention guiding a conveyor chain around a turn in the path of the conveyor, as seen from the outer side of the turn.
Figure 2:
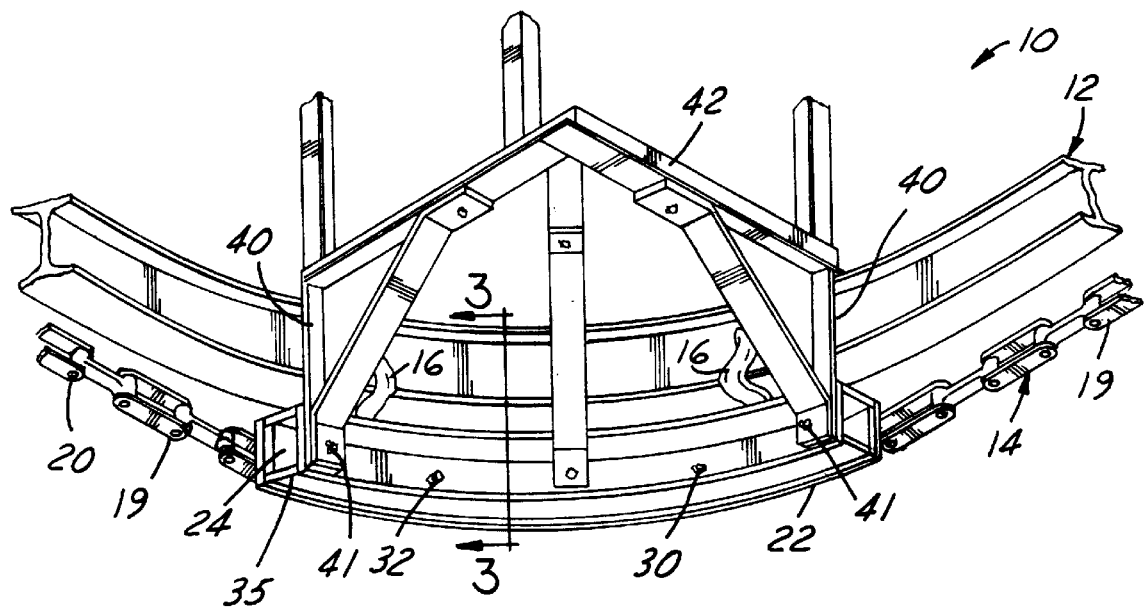
FIG. 2 is a view similar to FIG. 1 but as seen from the inner side of the turn.
Figure 4:
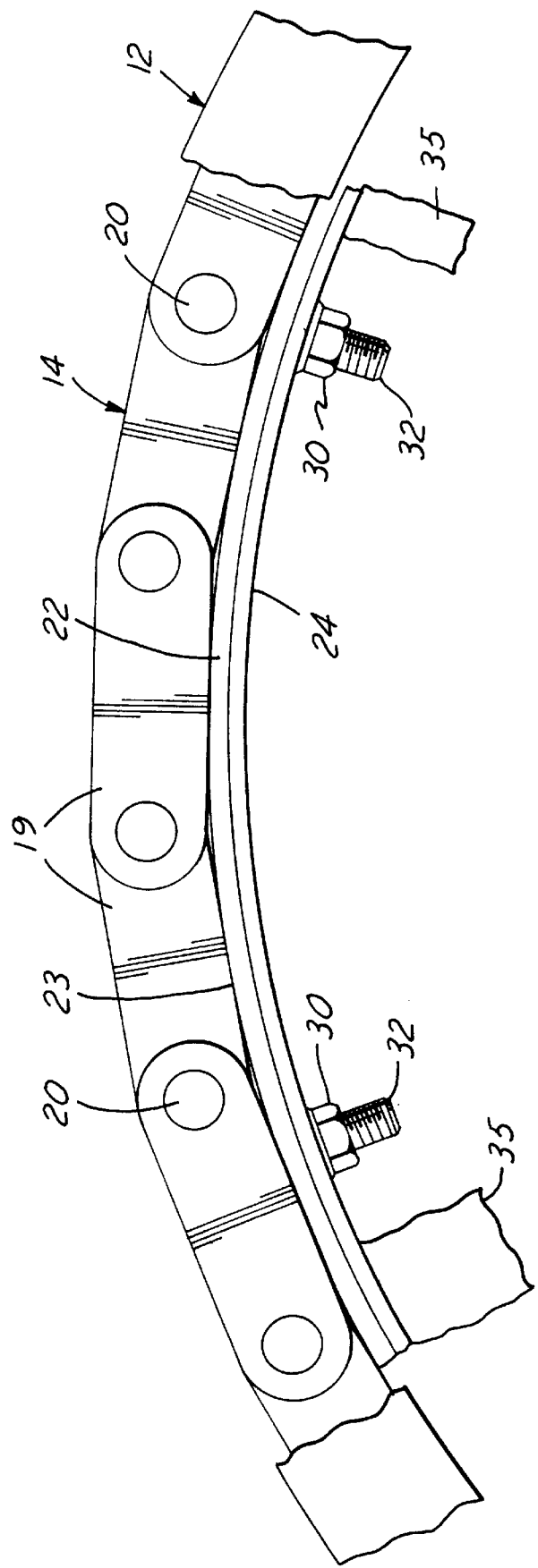
FIG. 4 is a top plan view on an enlarged scale with parts broken away of a section of the conveyor chain shown being guided around a turn in the conveyor path with a portion of the guide strip shown.

Referring now more particularly to the drawings, a conveyor system 10 is shown comprising a support rail in the form of a horizontal I-beam 12 which extends above the path of the horizontal conveyor chain 14. In the fragmentary views of FIGS. 1 and 2, the I-beam 12 will be seen extending in a curve conforming to a curve in the horizontal path of the chain. The curve is shown as formed in an arc of a circle which may be of small or large radius. The metal chain 14 is suspended from the I-beam by hangers 16 provided with wheels 18 which run on the lower flange of the I-beam. The conveyor chain 14 is shown as being of the type having links 19 connected together by pivot pins 20. As seen in FIG. 1, the hangers 16 are vertically suspended from the support rail 12 with their upper end portions connected to the rollers or wheels 18 and their lower end portions connected to the chain 14.

Disposed along the path of the conveyor chain at the turn is a chain guide which is in the form of a single, continuous, flat, planar elongated plastic strip 22 of the same curvature as the curved section of the path. The guide strip 22 preferably extends for the full length of the curve in the path of the chain and vertically above, below and coextensive with the chain. If the guide strip extends for less than the fall length of the curve, then it will extend for at least a major portion of the curve and preferably will be located at the center of the curve. The guide strip 22 is mounted in a horizontal position closely adjacent to and on the radially inner side of the curved section of the path of the chain. The guide strip is made of a hard anti-friction plastic material which has a smooth vertically extending radially outer guiding sliding surface 23 in metal-to-plastic sliding contact with the chain. The material of the plastic strip is preferably nylon or Teflon (polytetrafluoroethylene) which is relatively inexpensive. The surface 23 is quite slippery so that it will guide the link chain with a minimum of resistance and not add significantly to the power requirement of the system.

The plastic guide strip 22 is mounted on a relatively stiff flat, planar reinforcing metal backing strip 24 which is of substantially the same length and curvature as the plastic strip. The backing strip 24 is narrower than the guide strip 22 and defines therewith marginal edge portions 25, 27 along the length of the structure. The backing strip is co-extensive with the guide strip and is secured in surface-to-surface relation to the radially inner surface of the plastic strip by the nuts 30 and bolts 32. The bolts extend through holes in the backing strip and in the plastic strip. The holes in the plastic strip are countersunk to provide recesses for the heads 34 of the bolts so that the heads do not project outwardly beyond the outer surface of the plastic strip. The metal backing strip 24 is carried by vertical bars 40 joined to a suitable fixed overhead support structure 42. As will be noted in FIG. 3, a U-shaped bracket 35 is welded to the backing strip 24 at 37, 39. A pair nut and bolt structure 41 secures the bracket 35 to the bars 40.

In use, the chain 14 will have sliding contact with the radially outer surface 23 of the guide strip 22 throughout the full length of the guide strip. The guide strip is resistant to wear and will function for a long period of time before replacement is necessary. The guide strip is made of an inexpensive plastic material which has a slippery anti-friction surface that the chain slides over with very little resistance.

FIG. 7 illustrates the prior art in which the conveyor chain 14 is guided around a curve in the path by a series of rollers 50 spaced apart along the inside of the curve. As previously mentioned, the rollers have a relatively short life (about 35–45 days) because the bearings degrade. They are relatively expensive to replace. In one test, a plastic piece like that of the present invention lasted nine months and was still working. Further, the plastic pieces are less expensive, currently costing about $1.35 per foot versus $16.60 per roller.

What is claimed:

1. A conveyor system, comprising:
   a horizontally extending support rail having a curved portion;
   a plurality of wheels adapted to roll along said support rail;
   a plurality of hangers vertically suspended from said support rail, said hanger having upper end portions and lower end portions, said upper end portions respectively connected to said rollers;
   a metal chain having metal links connected to said lower end portions of said hangers a support structure located adjacent to said curved portion of said support rail and adjacent to said chain;
   a chain guide mounted to and supported by said support structure, said chain guide spaced apart from and extending horizontally below said curved portion of said support rail, said chain guide comprising a flat planar curved reinforcing metal backing strip and a flat planar curved plastic guide strip mounted to said flat planar curved metal backing strip, said plastic guide strip extending vertically above, below and coextensive with said metal chain, such that said metal chain is horizontally supported by and slides against said plastic guide strip with a metal-to-plastic contact.

* * * * *